March 11, 1958 W. AIKEN 2,826,755

TELEVISION BACKING

Filed March 10, 1954 3 Sheets-Sheet 1

Inventor
WILLIAM AIKEN
By Fetherstonhaugh & Co.
Attys

Inventor
WILLIAM AIKEN
By Fetherstonhaugh & Co.
Att'ys

March 11, 1958 W. AIKEN 2,826,755

TELEVISION BACKING

Filed March 10, 1954 3 Sheets-Sheet 3

Inventor
WILLIAM AIKEN
By~ Fetherstonhaugh & Co.
Attys 2,826,755
Patented Mar. 11, 1958

1

2,826,755

TELEVISION BACKING

William Aiken, Wilmer Heights, Ontario, Canada, assignor to Somerville Limited, London, Ontario, Canada Application March 10, 1954, Serial No. 415,389
9 Claims. (Cl. 340—367)

This invention relates to improvements in backings for television receiver cabinets.

The conventional form of backing for television receiver cabinets comprises a fibre or plywood board having an opening therein through which the socket base of the television picture tube may protrude rearwardly of the cabinet for a few inches. The protruding portion of the tube is covered by an enclosure which may be moulded from plastic, fibre board or the like and which is itself fastened to the backing board extending rearwardly from the opening therein.

The present invention has for its object the provision of a very cheap but rugged construction of rearwardly extending tube base enclosure adapted to be mounted on the backing board of the receiver in a simple but effective manner and to be automatically locked in place by reason of the features of construction set forth in more detail hereinafter.

The invention will be appreciated by a study of the following specification taken in conjunction with the accompanying drawings.

Figure 1:
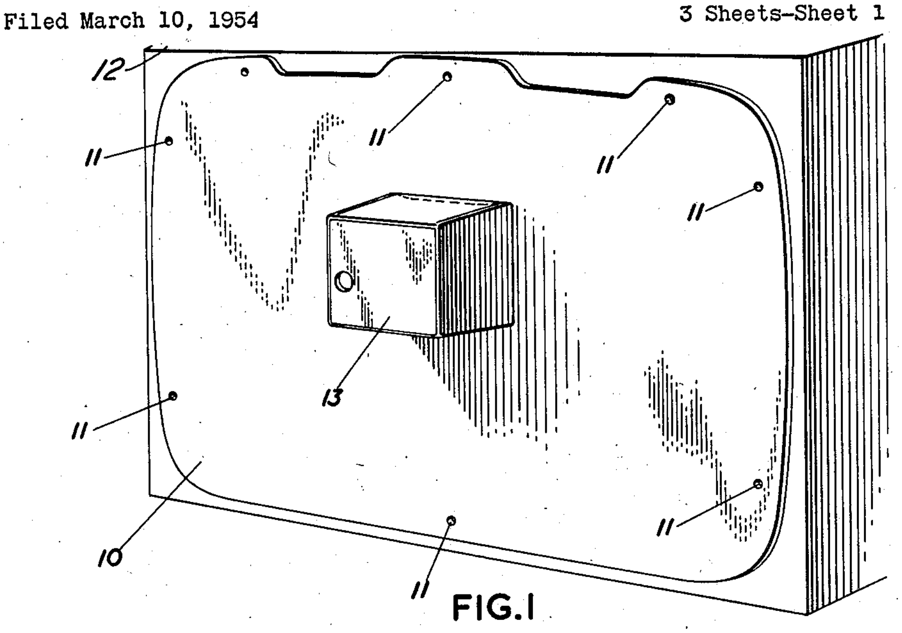
Figure 1 is a view of a television receiver cabinet backing construction according to the invention, being essentially an external view thereof.

Referring to the drawings, the television receiver cabinet backing of the invention generally comprises a backing board 10 of heavy cardboard or fibrous material adapted to be fastened by screws through the various holes 11 of the receiver cabinet 12 generally indicated in Figure 1. The television picture tube base housing 13 projects rearwardly from the board or panel 10 and is locked thereto in a manner of rigid construction evident in more detail hereinafter.

Figures 3, 4:
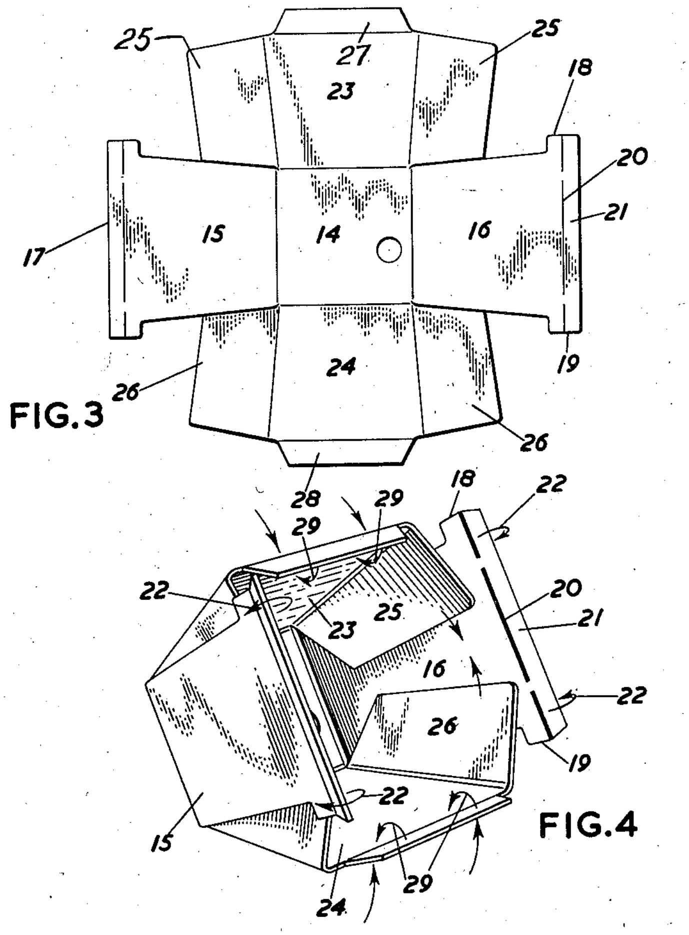
Figure 3 illustrates a blank which may be struck from cardboard for forming the television tube base housing of the cabinet backing of the invention.
Figure 4 illustrates the manner of folding an assembly of the housing of Figure 3.

Referring to Figure 3, the housing 13 is formed from a sheet of heavy card material and embodies a rear wall 14 having side walls 15 and 16 diverging outwardly therefrom to transverse locking bar forming portions 17, 18 and 19. Crease lines or cuts 20 are impressed centrally of the bar portions 17 whereby flaps 21 of such portions 17 are folded over and stapled to form the bars of double thickness material, as illustrated by the direction of arrows 22 in Figure 4.

The top and bottom walls 23 and 24 respectively, are formed and similarly extend in divergent manner from the rear wall 14 carrying side flaps 25 and 26. End flaps 27 and 28 are also provided and are adapted to be folded over inwardly in the direction of arrows 29 in Figure 4 to be turned in and fastened to the walls 23 and 24. Notice that the flaps 25 and 26, upon folding of the walls, arrive inwardly of the side walls.

Figure 5:
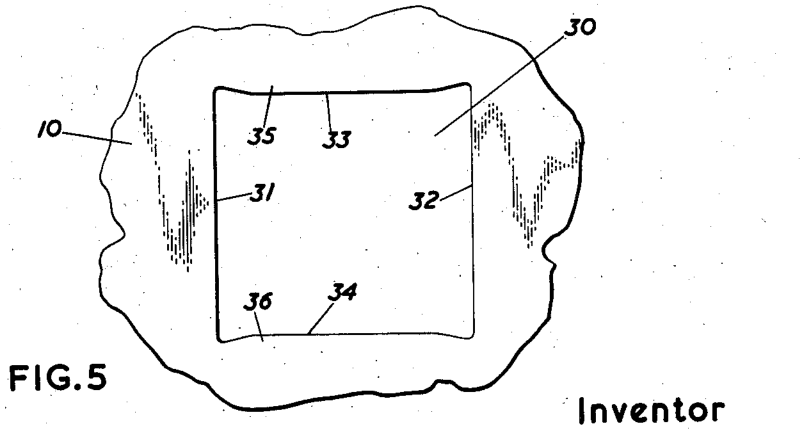
Figure 5 is a partial view of the backing board showing a special form of opening therein according to the invention adapted to co-operate with the construction of the tube base housing.

The backing board 10 has an opening 30 therein of special form as will be evident upon an examination of Figure 5. The side edges 31 and 32 of the opening are straight and parallel to one another whereas the top and bottom edges 33 and 34 have inwardly extending tongue portions 35 and 36 provided to constitute stops against inward movement of the housing 13 when locked in assembly with the backing board or panel.

Figure 2:
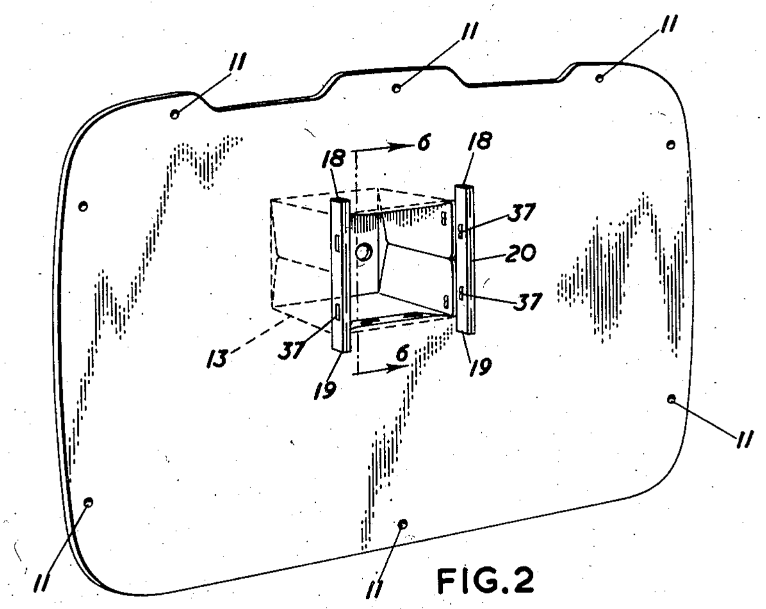
Figure 2 is the corresponding interior view of the backing of Figure 1.
Figure 6:
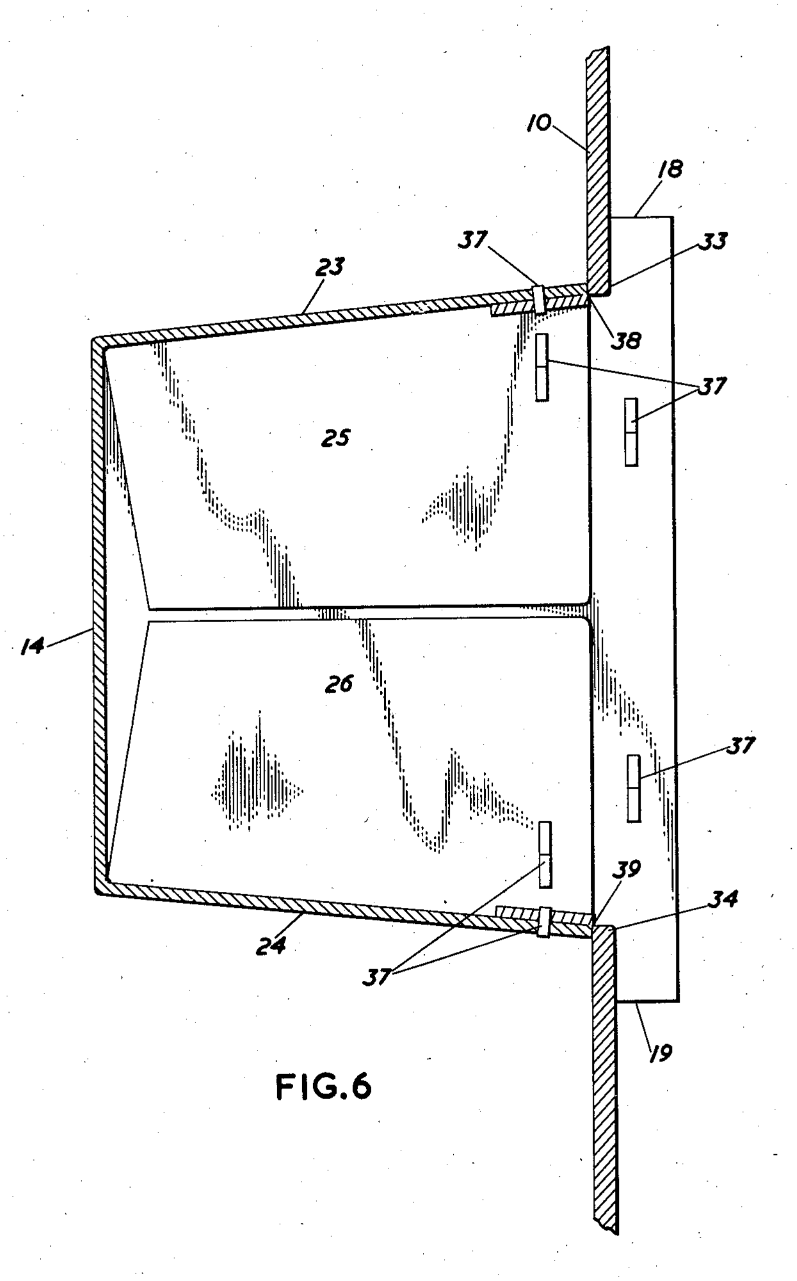
Figure 6 is a sectional view on the line 6—6 of Figure 2.

Referring to Figures 2 and 6, the housing blank is first folded to form the housing, the folded parts being secured together by suitable metal fasteners 37. The rear wall end of the housing is then inserted through the orifice 30 from the front of the backing board 10, with its folded over edge portions 21 in register with the edges 31 and 32 of the orifice 30. It will be apparent from Figure 6 that the inwardly projecting tongues 33 and 34 of the opening 30 are spaced apart a lesser distance than the outside dimension existing between the corresponding edges of the top and bottom walls 23 and 24 of the housing. Moreover, it will be apparent that the projections 18 and 19 are spaced from the free edges 38 and 39 of the top and bottom walls a sufficient distance to accommodate the thickness of the backing board or panel 10. Accordingly, the free edges 38 and 39 may be brought to the position illustrated in Figure 6 by permitting deformation of the housing when it is pressed into position within the opening 30 and upon adjustment of the housing in the locked position the upper and lower tongue projections 33 and 34 will be contained within the space formed between the housing edges 38 and 39 and the adjacent edges of the projections 18 and 19. It may be necessary to assist this locking action by manipulation of the top and bottom walls with the hand in the region of the free edges thereof.

It has been found that the structure of housing and backing panel described, co-operate in locking function to present a rigid serviceable structure of a nature which may be manufactured at very low cost and at high rates of production without requiring the use of special moulding equipment.

What I claim as my invention is:

1. A backing closure for a television receiver cabinet, comprising a backing panel having an orifice therein through which a television receiver picture tube may project rearwardly, locking tongues extending inwardly from the edges of said orifice, a picture tube housing in the form of an open ended box-like structure adapted to be inserted into said orifice from the front of the panel with its open end surrounded by the orifice and its closed end projecting rearwardly of the panel, transverse projections extending outwardly from the open end of the housing for engagement with the front face of the panel for limiting the passage of the housing through the orifice, said projections being spaced away from the edge of the open end of the housing to provide spaces for the reception of the locking tongues extending inwardly from the edges of the orifice.

2. A backing closure as defined in claim 1 wherein the housing is formed with an even number of flat sides, the projections extending outwardly of the ends of two opposite sides.

3. A backing closure as defined in claim 1 wherein the housing is formed with an even number of flat sides, the projections being in the form of bars extending across the outer ends of two opposite sides and being of greater length than the length of said sides.

4. A backing closure as defined in claim 1 wherein the housing is of four sided frustrum pyramidal form with its open end of greater area than its closed end, the projections being in the form of integral bars extending across the outer ends of two opposite sides and being of greater length than the length of said sides, and wherein the orifice in the panel is also four sided to receive the housing, the locking tongues extending inwardly from two opposite sides of the orifice.

5. A backing closure as defined in claim 1 wherein the housing has an equal number of flat sides and is folded from an integral blank of sheet material, the open end edges of two opposite sides being formed with integral transverse locking bar portions which extend beyond said sides to constitute the projections engaging the front of the panel to limit the passage of the housing through the panel orifice, the panel orifice having the same number of sides as the housing, the locking tongues extending from two opposite sides of the orifice.

6. A backing closure as defined in claim 1, wherein the housing has an equal number of flat sides and is folded from an integral blank of sheet material, the open end edges of two opposite sides being formed with integral transverse locking bar portions folded back upon themselves to provide a double thickness of material and which extend beyond said sides to constitute the projections engaging the front of the panel to limit the passage of the housing through the panel orifice, the panel orifice having the same number of sides as the housing, the locking tongues extending from two opposite sides of the orifice.

7. A housing for a picture tube in a television receiver wherein the picture tube projects rearwardly through an orifice in the backing panel of the receiver, and comprising an open ended box-like structure adapted to be inserted into said orifice from the front of the panel with its open end surrounded by the orifice and its closed end projecting rearwardly of the panel, transverse projections extending outwardly from the open end of the housing for engagement with the front face of the panel for limiting the rearward passage of the housing through the orifice, said projections being spaced away from the edge of the open end of the housing to provide spaces for the reception of tongue portions of a panel edging the orifice.

8. A backing closure as defined in claim 7, wherein the housing is formed with an even number of flat sides, the projections extending outwardly from the ends of opposite sides.

9. A backing closure as defined in claim 7, wherein the housing is formed with an even number of flat sides, the projections being in the form of bars extending across the outer ends of two opposite sides and being of greater length than the length of said sides.

References Cited in the file of this patent

UNITED STATES PATENTS

| | | |
|---|---|---|
| 1,956,196 | Korab | Apr. 24, 1934 |
| 2,642,566 | Regnier | June 16, 1953 |